July 27, 1965  A. HILL  3,197,264
THRUST PADS
Filed Jan. 14, 1963 5 Sheets-Sheet 1

INVENTOR
ALFRED HILL

July 27, 1965  A. HILL  3,197,264
THRUST PADS

Filed Jan. 14, 1963  5 Sheets-Sheet 2

INVENTOR
ALFRED HILL

July 27, 1965  A. HILL  3,197,264
THRUST PADS

Filed Jan. 14, 1963  5 Sheets-Sheet 3

INVENTOR
ALFRED HILL

INVENTOR
ALFRED HILL

July 27, 1965  A. HILL  3,197,264

THRUST PADS

Filed Jan. 14, 1963  5 Sheets-Sheet 5

INVENTOR
ALFRED HILL

United States Patent Office 3,197,264
Patented July 27, 1965

3,197,264
THRUST PADS
Alfred Hill, Wembley, England, assignor to The Glacier Metal Company Limited, Wembley, England, a company of Great Britain
Filed Jan. 14, 1963, Ser. No. 251,140
Claims priority, application Great Britain, Jan. 19, 1962, 2,113/62
5 Claims. (Cl. 308—160)

This invention relates to thrust bearing pads such as are used to make up a thrust bearing ring.

In the past, it has been the practice to form such pads as sectors of an annular ring, the inner and outer diameters of which are calculated in accordance with the characteristics of the thrust bearing. This has meant that different bearing pads have to be used for each different size of thrust ring and the main object of the present invention is to enable standard thrust pads to be provided which can be used for thrust rings of various diameters, the distance between the outer and inner radii of the thrust ring remaining the same.

The proportions and useful bearing area of the assembled ring depend upon the size of pad used and the number of pads. The radial width of the pad used determines the distance between inner and outer diameters of the assembled thrust ring. The actual values of the two diameters depend upon the number of pads used and the chosen proportions of the pad.

The invention has various aspects since there are many different ways of carrying it into practice and accordingly, it may be defined by any one of the following statements.

(a) A thrust pad the shape of whose thrust bearing surface is defined by a number of sides each of constant curvature or varying curvature and of which at least two adjacent sides meet at an acute or an obtuse angle. A side of constant curvature may have a radius of curvature of infinity, that is to say, it may be of straight side. The corners formed by the intersections of the sides may be left sharp, or may be rounded off to any suitable radius.

(b) A thrust pad, the shape of whose thrust bearing surface is defined by three sides, each of constant curvature or varying curvature. The sides may be straight or curved or any combination of these, and if curved, the curvature may be constant or varying. The number of sides may be two or more if curved, or three or more if straight.

(c) A thrust pad, the shape of whose thrust bearing surface is defined by at least five sides, each of constant curvature or varying curvature.

(d) A thrust pad, the shape of whose thrust bearing surface is defined by at least three straight lines.

(e) A thrust, whose thrust pad bearing surface is symmetrical about two non-parallel axes.

(f) A thrust pad, the shape of whose thrust bearing surface has no straight sides.

(g) A thrust pad, the shape of whose thrust bearing surface is square, or rectangular, or triangular, or circular, or oval.

The invention includes a thrust ring comprising a number of similar thrust pads annularly arranged around the bearing axis, the pads being shaped to have radially inner and radially outer sides which are not circular arcs centred on the bearing axis. Alternatively or in addition, it may be said that the radially inner and outer sides are joined by sides which do not extend radially of the bearing axis.

From another aspect the invention may be defined as a set of thrust pads each as defined in any of the definitions (a) to (g) above, for use in assembling a thrust bearing whose diameter is within a substantial range of diameters depending on the number of pads used.

The invention may be carried into practice in various ways and certain embodiments will now be described by way of example.

It is required to provide a multi-pad thrust bearing ring in which the pads are of a standard shape so that the same pads can be used for different thrust rings of different diameters. Certain forms that the bearings can take are shown in the accompanying drawings, in which.

Figure 1A:
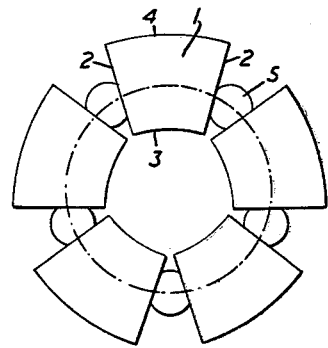
FIGURES 1A and 1B are diagrammatic plan, or part-plan views of two thrust rings of different diameters but using the same annular-sector-shaped pads.
Figure 9B:
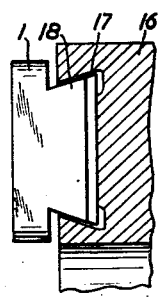
Figure 9A:
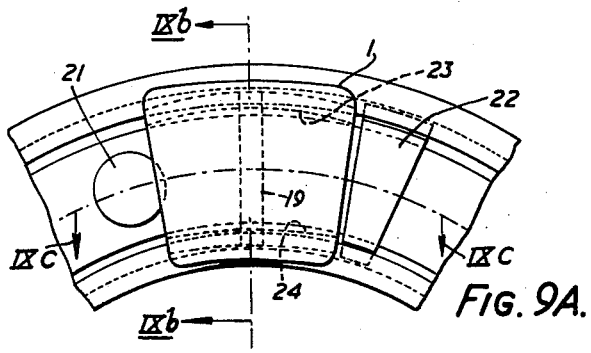
Figure 10B:
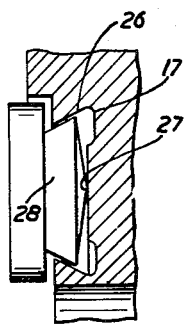
Figure 10A:
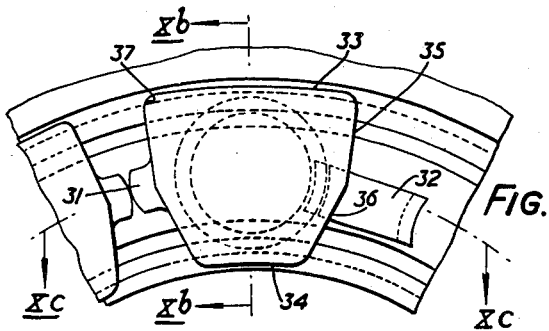
Figure 11B:
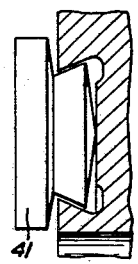
Figure 11A:
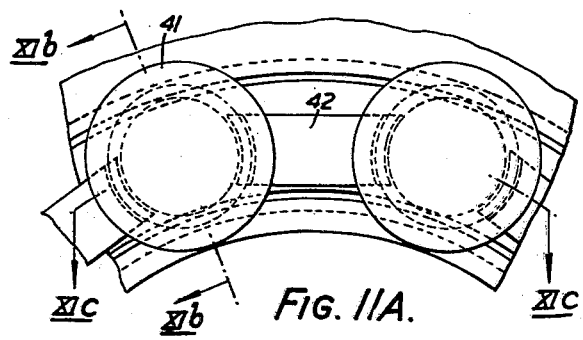
Figure 11C:
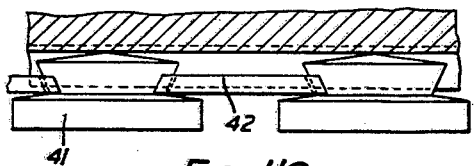
Figure 12B:
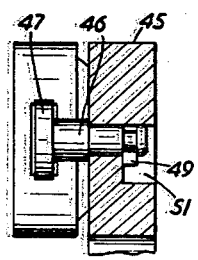
Figure 12A:
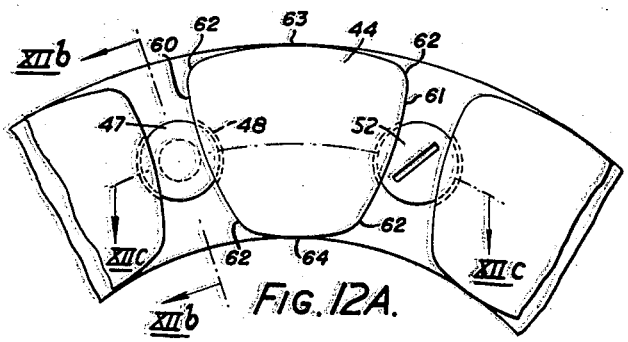

FIGURES 9A, B and C are respectively a plan, an end elevation, and a sectional elevation showing how a thrust pad of FIGURE 1A may be supported from a base ring;

FIGURES 10A, B and C are views corresponding to FIGURES 9A, B and C showing an alternative method of supporting a slightly differently shaped thrust pad;

FIGURES 11A, B and C are similar views showing a further method of supporting circular thrust pads;

FIGURES 12A, B and C show yet another way of supporting thrust pads; and

Figure 13A:
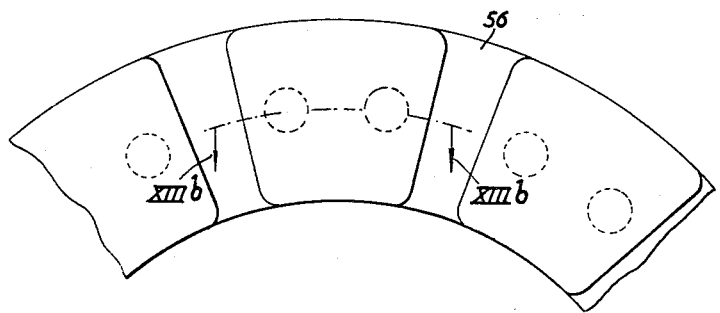

FIGURES 13A and B show a plan and a sectional elevation of another method of supporting a thrust pad from a base ring.

Figure 1B:
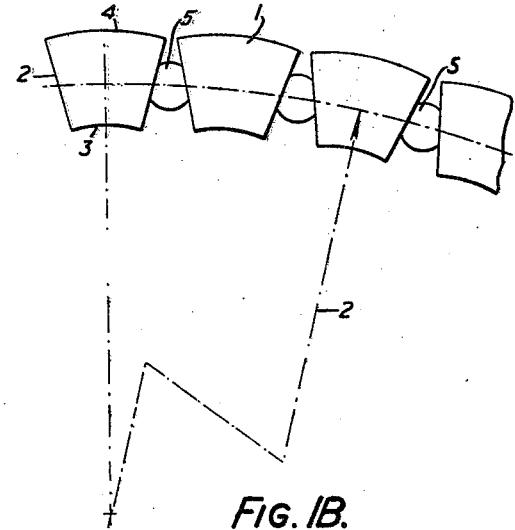

The thrust rings of FIGURES 1A and 1B are made up from a number of conventional thrust pads 1, the shape of whose thrust bearing surface is defined by two straight sides 2 and inner and outer concentric circular arcs 3 and 4, so that each pad has a bearing surface whose shape is a sector of an annular ring. However, the thrust ring does not correspond with that annular ring, and the shape of each thrust pad is not determined by the dimensions of the bearing. In known practice the sides 2 were radial and the inner and outer arcuate sides 3 and 4 were concentric with the bearing axis. In the thrust bearing of FIGURE 1A the thrust pads 1 are arranged in a smaller radius ring and in the bearing of FIGURE 1B they are arranged in a larger radius ring than the annular ring of which each pad is a segment.

This illustrates the novel concept of using standard thrust pads for bearings of different diameter. In each case the thrust pads 1 are shown spaced apart by circular spacers 5.

Figure 2A:
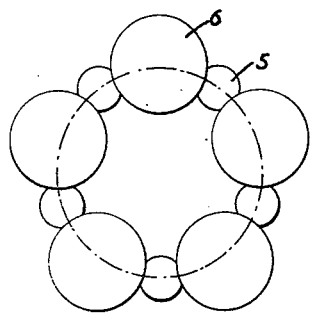
FIGURES 2A and 2B are similar views of two thrust rings employing circular thrust pads.
Figure 2B:
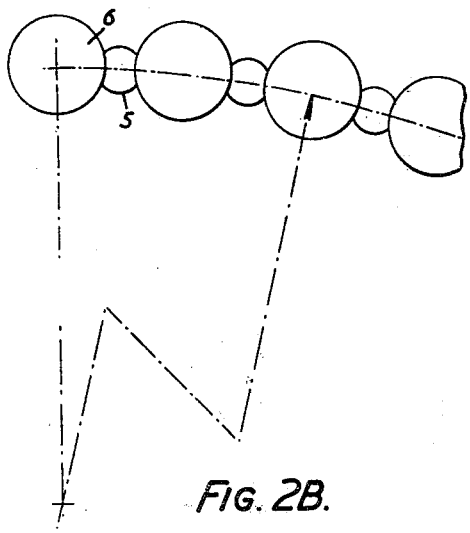

FIGURES 2A and 2B show similar bearings using thrust pads 6 which are of circular shape.

Figure 3:
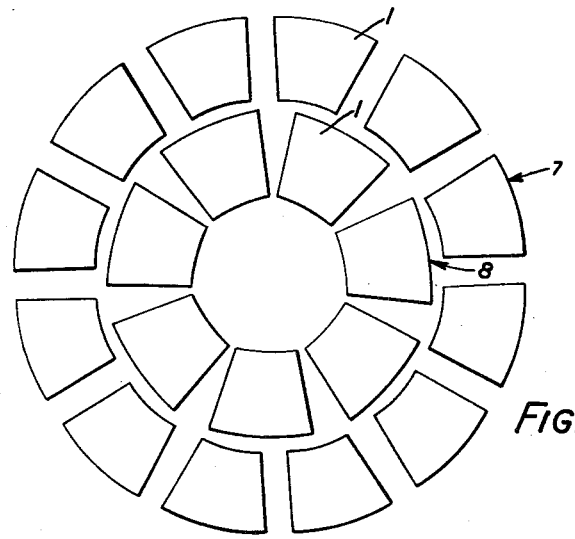
FIGURE 3 is a plan view of a thrust ring somewhat similar to the thrust ring of FIGURE 1A but of greater radial width.

Then FIGURE 3 shows how the thrust pads 1 of FIGURES 1A and 1B can be used in a thrust ring of greater radial width by having two rings of thrust pads 1, an outer ring 7 of twelve pads and an inner ring 8 of seven pads all nineteen pads being identical. It will be seen that in the bearings of FIGURES 1 and 3, the straight sides of the thrust pads 2 do not extend exactly radially and nor are the arcuate inner and outer sides 3 and 4 concentric with the thrust ring.

Figure 4:
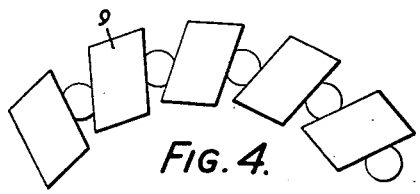
FIGURES 4 to 8 are part-plan views corresponding to FIGURES 1B and 2B of similar thrust rings using thrust pads of various shapes.
Figure 5:
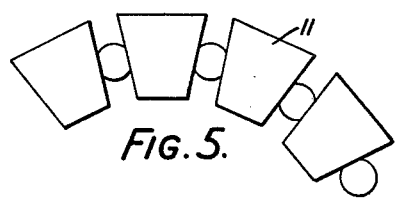

FIGURE 4 shows how standard thrust pads 9 of parallelogram shape can be used, and FIGURE 5 shows the use of thrust pads 11 of trapezium shape.

Figure 6A:
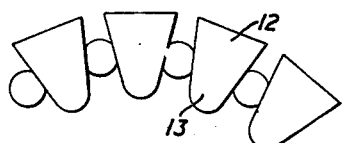
Figure 6B:
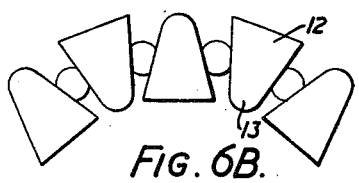

In FIGURES 6A and 6B the thrust pads are generally triangular although the most acute angle of these pads 12 is rounded off at 13 by a circular arc. In FIGURE 6A all the apices 13 are directed radially inwardly whereas in FIGURE 6B, they are directed alternately radially inwardly and radially outwardly.

Figure 7:
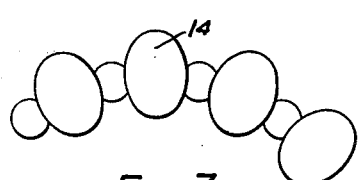
Figure 8:
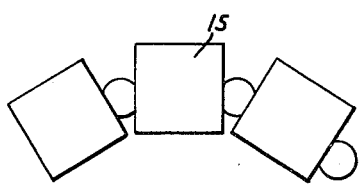

FIGURE 7 shows how thrust pads 14 of elliptic shape can be used and FIGURE 8 shows the use of square thrust pads 15.

Figure 9C:
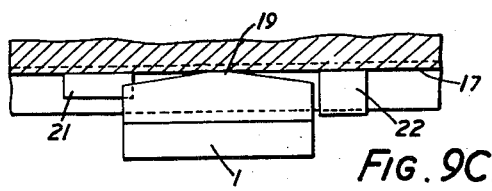

In FIGURES 9A, B and C a thrust pad 1 is shown supported on an annular base 16 which has a dove-tailed section groove 17 for housing a correspondingly shaped root 18 on the thrust pad. As can be seen from FIGURE 9C, the root 18 is of tapered sections so that it makes contact with the base of the groove 17 only at the circumferential centre of the thrust pad 19. This enables the thrust pad to tilt about the line of contact at 19 in accordance with the bearing load. FIGURES 9A and 9C show two alternative spacers between adjacent thrust pads 1, a circular spacer 21 to the left hand side of FIGURE 9A and a wedged shaped spacer 22 to the right hand side. It is pointed out that the radially outer and inner sides 23 and 24 of the root 18 are curved with such radii that the outer side can fit into a groove in the smallest ring base with which it is contemplated using this pad, and the inner side 24 is curved to fit into the largest such ring. The inner side 24 might in fact be straight.

Figure 10C:
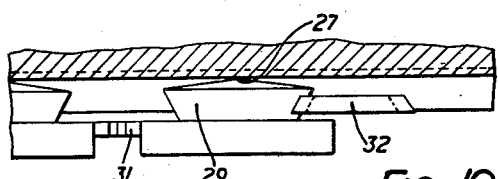

As shown in FIGURES 10A, B and C the thrust pads can be formed with roots 26 of circular section having an inner point 27 for contact with the bottom of the groove 17 and being of dove-tail section as shown at 28 and 29 in FIGURES 10B and 10C. These pads can tilt in any direction about the point 27. To the left of FIGURES 10A and 10C are shown spacer lugs 31 formed integrally with the thrust pads and to the right of FIGURES 10A and 10C are shown separate spacers 32.

The bearing pad of FIGURES 10A, B and C is essentially a six sided pad having radially outer and inner curved sides 33 and 34 joined at each side by two radial sides 35 and 36 at different angles to the radius to the centre of the thrust ring. Where the radial sides 35 and 36 join the inner and outer arcuate sides, the corners are rounded off as at 37. The thrust ring of FIGURES 11A, B and C is similar to that of FIGURES 10A, B and C except that the thrust pads 41 are circular. Separate spacers 42 similar to the spacers 32 of FIGURES 10A, B and C are shown.

Figure 12C:
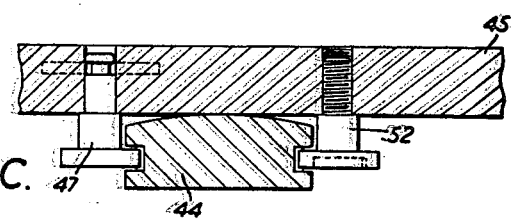
Figure 13B:
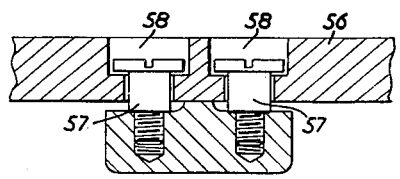

In the thrust ring of FIGURES 12A, B and C the thrust pads 44 do not have roots lying in a groove in the supporting base but are held on the base 45 by means of pins 46 having heads 47 entering into slots 48 at the sides of the bearing pads 44 and held, in the embodiment shown in FIG. 12B by spring clip keys 49 in a recess 51 in the reverse side of the base 45. These pins 46 not only act to hold the thrust pads 44 on the base, but also serve as spacers between adjacent thrust pads. The pins 52 shown to the right of FIGURES 12A and 12C are not in fact held in the base 45 by the spring clips 49 but are screwed into threaded bores in the base. Finally FIGURES 13A and 13B show thrust pads held against the base 56 each by two screws 57 threaded into the undersides of the thrust pads and having shanks which are loose fits in bores 58 in the reverse side of the base 56.

As shown in FIGS. 12A, B and C, all four of the sides of the pads 44 are arcuate convex outward, two of said arcuate sides 60 and 61 being opposite each other and being of equal shape and the other two sides 63 and 64 being opposite each other and of unequal shape. The pads 44 are symmetrical about an axis in the thrust bearing surface between the equal arcuate sides 60 and 61 and the corners 62 are rounded where the adjacent sides meet.

What I claim as my invention and desire to secure by Letters Patent is:

1. A thrust pad having four sides and a thrust bearing surface defined by said sides, all of said sides being arcuate convex outwards, two of said arcuate sides being opposite each other and being of equal shape and the other two of said sides being opposite each other and of unequal shape, the pad being symmetrical about an axis in the thrust bearing surface between the equal arcuate sides, and rounded off corners where adjacent sides meet.

2. A thrust bearing ring comprising a base and a number of similar circumferentially disposed thrust pads secured to said base, each pad being a pad as claimed in claim 1.

3. A thrust bearing ring as claimed in claim 2 in which each pad has a root supported in a groove in said base, the root having radially outer and inner sides respectively of smaller radius than the outer side of the groove and of larger radius than the inner side of the groove.

4. A thrust bearing comprising two concentric thrust bearing rings each comprising a number of thrust pads circumferentially disposed in a ring, each pad having sides and a thrust bearing surface defined by the sides and the pads in both rings being similar, the two rings being of different radii and having different numbers of pads.

5. A thrust bearing comprising two concentric thrust bearing rings each comprising a number of thrust pads circumferentially disposed in a ring, each pad having four sides and a thrust bearing surface defined by said four sides, all of said sides being arcuate convex outwards, two of said arcuate sides being opposite each other and of equal shape and the other two of said arcuate sides being opposite each other and of unequal shape, each pad being symmetrical about an axis in the thrust bearing surface between said two equal arcuate sides and each pad having rounded off corners where adjacent sides meet, the pads in both rings being similar and the two rings being of different radii and having different numbers of pads.

References Cited by the Examiner

UNITED STATES PATENTS

| 1,201,057 | 10/16 | Kingsbury | 308—160 |
| 1,666,521 | 4/28 | Allen | 308—160 |
| 2,744,799 | 5/56 | Howarth | 308—160 |
| 2,871,070 | 1/59 | Dunn | 308—160 |
| 2,890,916 | 6/59 | Maynard | 308—160 |

FOREIGN PATENTS

| 25,958 | 6/15 | Norway. |

DON A. WAITE, *Primary Examiner.*

FRANK R. SUSKO, *Examiner.*